NOISE SUPPRESSOR FOR SERVOSYSTEM

Filed Dec. 29, 1965 2 Sheets-Sheet 1

INVENTORS:
FRANCIS A. GOPLEN
JOHN W. MC CULLOUGH
RICHARD H. THOMAS
BY Richard H. Smith
ATTORNEY Sept. 9, 1969 F. A. GOPLEN ET AL 3,466,516

NOISE SUPPRESSOR FOR SERVOSYSTEM

Filed Dec. 29, 1965 2 Sheets-Sheet 2

United States Patent Office 3,466,516
Patented Sept. 9, 1969

3,466,516
NOISE SUPPRESSOR FOR SERVOSYSTEM

Francis A. Goplen, Zumbrota, and John W. McCullough and Richard H. Thomas, Rochester, Minn., assignors to International Business Machines Corporation, Armonk, N.Y., a corporation of New York Filed Dec. 29, 1965, Ser. No. 517,262
Int. Cl. H02p 1/54, 5/46, 7/68
U.S. Cl. 318—18 7 Claims

ABSTRACT OF THE DISCLOSURE

A circuit for controlling a servomechanism having an output device driven in response to an error signal wherein a disabling mechanism is utilized for inhibiting operation of the output device in response to a noise pulse. A noise pulse is identified by concurrent outputs from circuits which indicate that the error signal due to noise has exceeded a predetermined magnitude and predetermined rate of change while error signal control is reestablished by a return of the signal magnitude to a value within the predetermined range.

This invention relates to servosystems and, more particularly, to servosystems of the type wherein a mechanical output device is driven in accordance with an error signal, the output of the device being employed to generate negative feedback to reduce the error signal.

In prior art servosystems such as are employed, for example, to drive the recording pen of a strip chart recorder or to operate some other type of display device, noise pulses at the system input tend to cause undesirable distortions or "spikes" at the output.

It is therefore an object of the present invention to provide an improved servosystem of the type described which tends to suppress the effects of input noise pulses on the output of the system.

In accordance with the present invention means are provided to monitor the error signal of the system to detect input noise pulses and to inhibit the operation of the output device for the duration thereof. Noise pulses are detected in the invention by means which inspect both the magnitude and the rate of change of the error signal and compare these parameters against predetermined standard values. When the predetermined criterion is determined to exist for both parameters, switch means are activated to remove the error signal input from the output device, thereby temporarily inhibiting the latter's operation. Additional means are provided to enable the system to distinguish between noise pulses and valid shifts in the level of the input signal having the same characteristics as noise pulses, whereupon substantially normal operation is obtained in response to said valid input shifts.

The foregoing and other objects, features and advantages of the invention will be apparent from the following more particular description of a preferred embodiment of the invention, as illustrated in the accompanying drawings.

Figure 1:
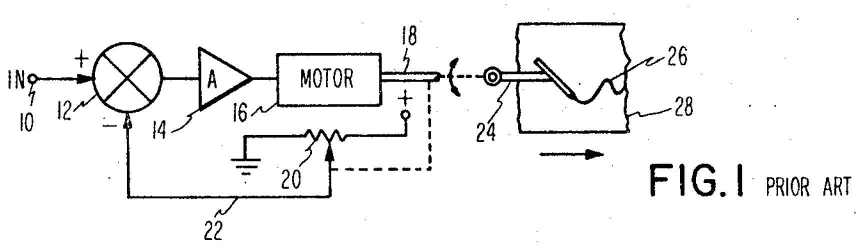
FIG. 1 PRIOR ART
FIG. 1 is a schematic diagram showing a typical servosystem of the prior art.

In a typical prior art servosystem, as shown in FIG. 1, an analog signal is received on input terminal 10 and fed to a summation circuit 12. In the summation circuit a negative feedback signal on line 22 is summed with the input and an error signal is generated and transmitted to an amplifier 14. The amplified error signal in turn is fed to a servomotor 16, or other output device, driving it in a direction dependent upon the polarity of the error signal and, in some instances, at a velocity dependent upon the magnitude of the error signal. Movement of the motor output shaft 18 is used to drive the slide wire of a potentiometer 20, developing the feedback signal on line 22.

The motor responds to the error signal in a manner causing the negative feedback to reduce the error signal. Thus, in accordance with well known servoloop principles, the movement of output shaft 18 is a physical approximation of the characteristics of the input signal. This movement is used to drive, for example, the pen 24 of a strip chart recorder to inscribe a line 26 on a moving strip 28 graphically representing the behavior of the input signal.

In utilizing this system to record the output of, for example, a fluid opacity indicator associated with an automatic analyzing system, certain unavoidable "noise" is introduced into the system. A noise pulse may be caused, for example, by a bubble or a foreign particle carried by the fluid being inspected by the analyzer. Passage of a bubble may cause a sudden increase in the amount of light admitted to the indicator, thus causing a sharp, positive pulse to appear at the input of the servorecorder. On the other hand a foreign particle may, for an instant, cut off the light altogether, generating a negative noise pulse. Such noise pulses are particularly undesirable when the output of the servo is being monitored by a peak detector since a noise spike could well be erroneously interpreted as a "peak" or a "valley."

Figure 2:
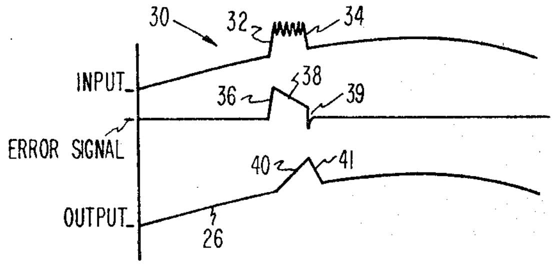
FIG. 2 PRIOR ART
FIG. 2 is a waveform diagram illustrating the operation of the system of FIG. 1 in response to an input noise pulse.

The system of FIG. 1 responds to an input noise pulse as shown in FIG. 2. The leading edge 32 of the noise pulse 30 causes the error signal to sharply increase as at 36. In responding to this sudden increase, output device 16 causes a sharp rise 40 in output trace 26 in an attempt to generate enough feedback to balance the input. The feedback generated causes a reduction 38 in the error signal with the result that the trailing edge 34 of the noise pulse reverses the polarity of the error signal, abruptly reversing the direction of output shaft 18. A negative slope 41 thus appears in the output trace immediately following the positive slope 40, the final result being an undesirable "spike" in the trace 26.

Figure 3:
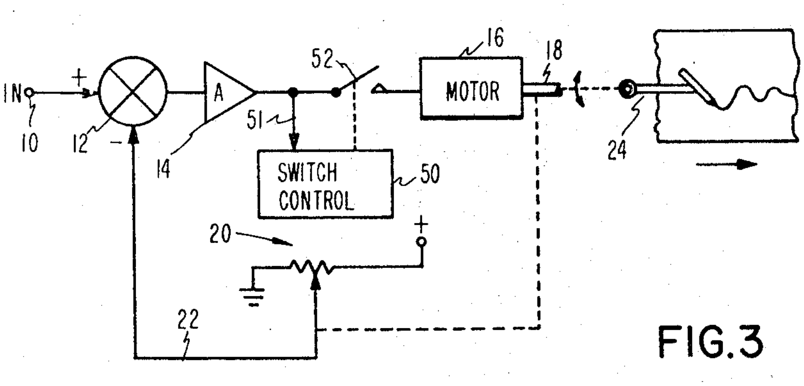
FIG. 3 is a schematic diagram generally depicting the overall arrangement of a preferred embodiment of a servosystem in accordance with the invention.
Figure 4:
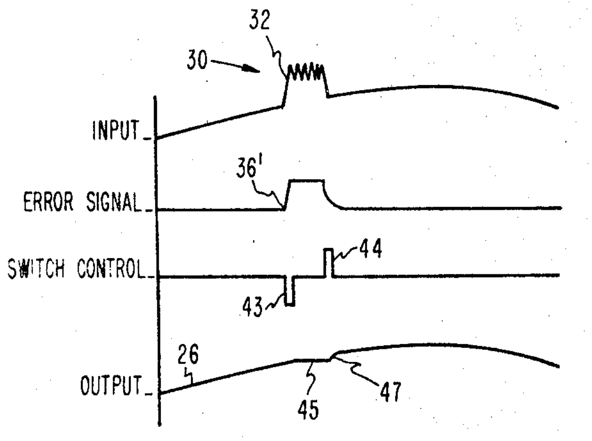
FIG. 4 is a waveform diagram illustrating the operation of the system of FIG. 3 in response to an input noise pulse.

The servosystem of the invention, shown schematically in FIG. 3, substantially eliminates such undesirable noise "spikes" in the output trace. A switch 52, controlled by circuit 50, is placed at the input to motor 16 to disconnect the error signal therefrom in response to a noise pulse at the system input. As shown in FIG. 4, the leading edge 32 of the input noise pulse 30 causes the error signal to sharply increases as at 36', just as in the prior art device. However, the switch control circuit 50 includes, among other means, a differentiation circuit which generates a negative signal 43 having an amplitude proportional to the rate of change of the error signal. The rate of change thus indicated is compared to a predetermined standard value and if it is in exess thereof, and if other criteria, described subsequently, are met, switch control circuit 50 opens the switch 52 to inhibit the operation of motor 16. This causes the output trace 26 to flatten out as at 45 and prevents the feedback signal on line 22 from changing. The error signal thus remains substantially constant for the duration of the noise pulse and then decreases sharply when the noise pulse terminates. This decrease in the error signal is sensed by the circuit 50, causing it to close switch 52 to restart motor 16.

When the switch closes, motor 16, in response to the small error signal component due to the difference existing between the level of the input signal at termination of the noise pulse as compared to its level at the beginning of the noise pulse, operates to bring the output trace back into line as shown at 47 (FIG. 4). The overall result is a trace which is substantially free of the effects of the input noise pulse.

Figure 5:
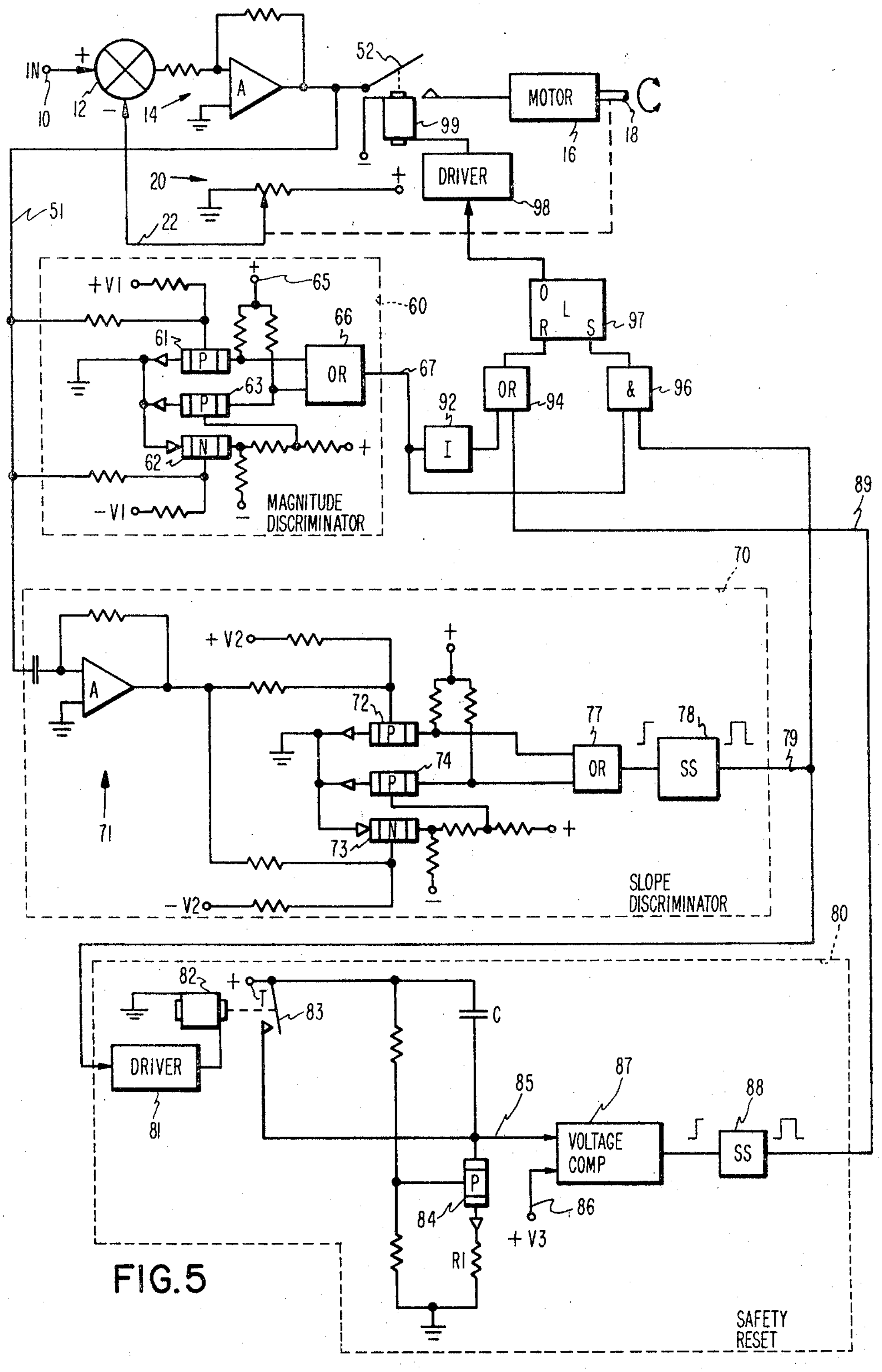
FIG. 5 is a schematic circuit diagram showing the details of the switch control circuit of FIG. 3.

Referring now to FIG. 5, a detailed description of the servosystem of FIG. 3 is hereinafter given. The summation circuit 12, operational amplifier 14, servomotor 16 and feedback potentiometer 20 are all conventional components well known to those skilled in the art of servomechanisms.

The switch control circuit 50 comprises a magnitude discriminating circuit 60, a slope discriminating circuit 70 and a safety reset circuit 80. The output signals generated by these circuits are employed to drive a logical inversion circuit 92, a logical OR circuit 94 and a logical AND circuit 96. The outputs from the latter two circuits are fed to a bistable latch circuit 97 the output from which in turn energizes a relay driver circuit 98, operating a relay coil 99 to control the switch 52.

The magnitude discrimination circuit 60 monitors the error signal at the output of amplifier 14 and generates a positive-going output signal on line 67 whenever the magnitude of the error signal exceeds, either positively or negatively, a level equal to V1 volts. The circuit comprises three grounded-emitter transistors 61, 62 and 63. Transistor 61 is normally biased into conduction by the base bias potential +V1 while transistor 62 is also normally biased into conduction by the base bias potential −V1. When transistor 62 conducts, its collector is substantially at ground potential, keeping the level at the base of transistor 63 high enough to bias transistor 63 on. A logical OR circuit 66 receives its inputs from the collectors of transistors 61 and 63, respectively. Therefore, when the transistors 61, 62 and 63 are conducting, both inputs to OR 66 are at the 0 (ground) level, causing output line 67 also to be at the 0 level.

When the error signal, which is fed to the bases of transistors 61 and 62 via line 51, positively exceeds V1 volts, the voltage level at the base of transistor 62 goes positive, turning transistor 62 off. This lowers the voltage level at the collector thereof to a level sufficient to turn transistor 63 off, thus generating a positive-going signal into the bottom input of OR 66 and causing a like signal to appear on output line 67. The error signal being in excess of +V1 volts does not affect transistor 61 since that transistor is already biased into conduction.

When the level on line 51 drops below −V1 volts, the voltage level at the base of transistor 61 goes negative, turning the transistor off. This causes the voltage level at the collector thereof to shift to substantially to the positive level of terminal 65. This positive-going signal is presented to the top input of OR 66, causing a similar signal to appear on output line 67. It is to be noted that in this circuit arrangement, the positive output level on line 67 is maintained until the level on line 51 drops back into the range between +V1 and −V1 volts. When this occurs, line 67 drops back to zero and a negative-going signal appears on output line 67.

The magnitude determination circuit 60 establishes magnitude criteria for the detection of input noise pulses. The voltage levels +V1 and −V1 represent the maximum valid positive and negative error signals which the system can generate. These levels may be quantitatively defined after determining the response rate of the system and the range of input frequencies (excluding noise) normally expected to be encountered. Error signal levels outside the plus and minus V1 range are thus recognized as possible noise by the circuit 60 and cause an output pulse to appear on line 67.

The slope discriminating circuit 70 establishes rate of change criteria for the detection of input noise pulses. The error signal on line 51 is fed to the input of a differentiating amplifier 71. A positive-going transition at the input of amplifier 71 causes a negative pulse, such as the pulse 43 of FIG. 4, to appear at the output thereof. The amplitude of the pulse is proportional to the rate of change of the transition. Similarly, a positive pulse, such as the pulse 44 of FIG. 4, appears at the output of amplifier 71 in response to a negative-going transition applied to its input. The negative amplitude of the pulse is proportional to the rate of change of the transition.

The output signals from amplifier 71 are compared against the reference levels +V2 and −V2 volts by a magnitude discriminating circuit comprising transistors 72, 73 and 74. This circuit is identical in its operation to the circuit 60, described above. The levels of V2 are chosen by determining the maximum rate of change, after considering the above-mentioned factors of system response rate and input frequency, which is likely for the error signal under normal operating conditions. Thus, a positive-going signal appears at the output of logical OR circuit 77 whenever the slope or rate of change of the error signal exceeds, either positively or negatively, the predetermined maximum "valid" rate of change. The positive-going signal from OR 77 is fed to the input of a single-shot multivibrator circuit 78 and triggers it to produce a positive, fixed-width output signal on line 79.

Output signals generated on lines 67 and 79 from the circuits 60 and 70, respectively, are fed to the inputs of logical AND circuit 96 wherein they combine to produce an output to set the bistable latch circuit 97. When the circuit 97 is switched to its set condition, the voltage level on the 0 or reset output thereof drops, deenergizing relay driving circuit 98 and relay coil 99 and allowing the switch armature 52 to open. This interrupts the error signal input to the motor 16 and arrests movement of the output shaft 18.

When the noise pulse terminates, the output signal on line 67 from the circuit 60 drops back to the 0 level since the magnitude of the error signal on line 51 drops back within its permissible range between + and −V1. The negative-going transition on line 67 causes inverter 92 to supply a positive-going transition to the left input of OR 94. The resultant output from OR 94 resets latch 97 to close switch 52, thereby reestablishing an input to the servomotor 16 and allowing the system to resume its operation as is depicted by the rise 47 in the output trace 26 of FIG. 4.

It is to be recognized that in some instances a valid input to the system such as a "step function" shift in the input level, might meet both the magnitude and slope noise criteria established by the circuits 60 and 70. In order to prevent such an input from completely shutting down the system, a safety reset circuit 80 is provided. This circuit, in effect, establishes a third criteria, pulse width, for the detection of noise pulses. When a transition in the input signal to the system is determined to be a noise transition, the output pulse on line 79 from the slope discriminating circuit 70 is transmitted to the input of circuit 80 as well as to AND circuit 96. Circuit 80 comprises a relay driving circuit 81 adapted to energize relay coil 82 which in turn controls switch armature 83. Switch 83 provides a shunt path to discharge capacitor C. When a pulse from single-shot 78 is received by the circuit 80, driver 81 energizes coil 82 to close switch 83. This discharges capacitor C and causes the voltage at terminal T to be applied to the collector of transistor 84 and to input 85 of a voltage comparator circuit 87. The circuit 87 may be, for example, a differential amplifier. The second input 86 to the comparator is supplied from a fixed potential +V3 which is lower than the potential present at terminal T.

When the output pulse from single-shot 78 terminates after a fixed period of time, driver 81 deenergizes coil 82 to open switch 83. The potential at input 85 begins to drop toward ground as capacitor C charges through transistor 84 and resistor R1. Some fixed length of time, depending upon the circuit parameters, is required for the voltage at 85 to drop to the fixed level of input 86. When this occurs after the predetermined time interval, the output of comparator 87 passes through 0 in the positive direction, triggering single-shot multivibrator 88. The output pulse generated from circuit 88 is applied to output line 89 whereby it is transmitted to the right-hand input of OR 94. This resets latch 97, if it has not already been reset by termination of the pulse on line 67, closing switch 52 to renew the input to motor 16.

Thus the circuit 80 provides a pulse to reset the latch 97 in the event that an input to the system (such as a step function input) causes a positive-going transition on line 67 which is unaccompanied by a subsequent negative-going transition. From this it is seen that the width of an input pulse, to be classified as a "noise" pulse, must be less than the time interval determined by adding the pulse duration of the output from single-shot 78 with the fixed duration required for the voltage level at the collector of transistor 84 to drop from that of terminal T to V3 once switch 83 is opened. This does not hold true, it should be noted, in a case where a very narrow noise pulse terminates and another noise pulse enters the system prior to the time that single-shot 78 "times out" from the first noise pulse. To prevent this situation from occurring, the width of the output pulse from single-shot 78 should be made at least as narrow as the narrowest expected noise pulse.

OPERATION

Overall operation of the circuit of FIG. 5 is as follows. When the leading edge 32 of a noise pulse 30 (FIG. 4) is received at input 10, the error signal output from amplifier 14 suddenly increases as at 36' to a level in excess of +V1. This causes a positive pulse to issue on output line 67. At the same time the increased error signal causes differentiating amplifier 71 to issue a negative pulse 43 (FIG. 4) which has an amplitude greater than V2 volts. This causes a positive pulse to issue from OR 77 to trigger single-shot 78, generating a positive pulse on output line 79. The pulses on lines 67 and 79 enable AND 96, causing it to generate an output pulse which sets latch 9, opening switch 52 and inhibiting the operation of motor 16.

Immediately following this action, when the pulse on line 79 terminates, the voltage level on input line 85 of voltage comparator 87 begins dropping toward V3 volts. However, before it gets there, the input noise pulse 30 (FIG. 4) terminates, causing the magnitude of the error signal to drop below V1 volts, thereby terminating the output signal on line 67. This causes inverter 92 to issue a positive pulse which resets latch 97 through OR 94. This action closes switch 52 to restart the motor 16. It is to be noted that a short time later, when the voltage level at input line 85 of comparator 87 reaches V3, single-shot 88 is triggered to produce an output pulse on line 89. This pulse is transmitted by OR 94 to the reset input of latch 97 but has no effect thereon since the latch is already in its reset condition.

In the event that the leading edge of the noise pulse was in fact a valid step-function input, the pulse issuing on line 89 does reset latch 97, causing switch 52 to close. Thereafter, the system responds to the step-function input in the same manner as prior art servosystems.

While the invention has been particularly shown and described with reference to a preferred embodiment thereof, it will be understood by those skilled in the art that various changes in form and detail may be made therein without departing from the spirit and scope of the invention.

We claim:

1. In a servosystem wherein an output device is driven in response to an error signal, the driving of said output device generating feedback to reduce said error signal, the combination comprising:

- a noise discrimination circuit producing first and second output signals in response to the leading and trailing edges, respectfully, of a noise pulse introduced into said servosystem, including:
  - a magnitude discrimination circuit producing a first intermediate signal when the magnitude of said error signal exceeds a predetermined level,
  - a slope discrimination circuit producing a second intermediate signal when the rate of change of said error signal exceeds a predetermined magnitude, and
  - a coincidence circuit responsive to said first and second intermediate signals for producing said first output signal; and
  - means acting in response to said output signals to inhibit the driving of said output device for the duration of said noise pulse.

2. The servosystem set forth in claim 1 wherein said slope discrimination circuit comprises:

- a differentiating circuit for producing a third intermediate signal having a magnitude proportional to the rate of change of said error signal; and
- a circuit responsive to said differentiating circuit for generating said second intermediate signal when said third intermediate signal exceeds a predetermined level.

3. The servosystem set forth in claim 1 wherein said noise discrimination circuit further comprises:

- means for generating said second output signal in response to the termination of said first intermediate signal from said magnitude discrimination circuit.

4. The servosystem set forth in claim 3, further comprising:

- a timing circuit responsive to said second intermediate signal to produce, after a predetermined time interval, a third output signal to perform the function of said second output signal, said third output signal being rendered ineffective by the occurrence of said second output signal during said predetermined time interval.

5. The servosystem set forth in claim 3 wherein said operating means comprises:

- a bistable circuit settable to a first state in response to said first output signal and settable to a second state in response to said second output signal; and
- said switching means is adapted to disconnect said error signal input when said bistable circuit is in said first state and to connect said error signal input when said bistable circuit is in said second state.

6. The servosystem set forth in claim 5, further comprising:

- a timing circuit responsive to said second intermediate signal to produce, after a predetermined time interval, a third output signal to switch said bistable circuit to said second state.

7. The servosystem set forth in claim 6 wherein said slope discrimination circuit comprises:

a differentiating circuit for producing a third intermediate signal having a magnitude proportional to the rate of change of said error signal; and a circuit responsive to said differentiating circuit for generating said second intermediate signal when said third intermediate signal exceeds a predetermined level.

References Cited

UNITED STATES PATENTS

| | | |
|---|---|---|
| 2,823,877 | 2/1958 | Hess. |
| 2,869,063 | 1/1959 | Hess. |
| 2,951,974 | 9/1960 | Silver. |
| 3,100,861 | 8/1963 | Osder. |
| 3,135,485 | 6/1964 | Miller. |
| 3,229,270 | 1/1966 | Rosenblatt. |
| 3,239,733 | 3/1966 | Sikorra. |
| 3,356,921 | 12/1967 | Bradford et al. |

ORIS L. RADER, Primary Examiner

T. E. LYNCH, Assistant Examiner

U.S. Cl. X.R.

318—28, 448